(12) United States Patent
Wetter et al.

(10) Patent No.: US 11,878,375 B2
(45) Date of Patent: Jan. 23, 2024

(54) CLAMPING DEVICE AND ASSOCIATED LASER WELDING APPARATUS

(71) Applicant: EVOSYS LASER GMBH, Erlangen (DE)

(72) Inventors: Michael Wetter, Pinzberg (DE); Andreas Kraus, Fürth (DE); Kreshnik Ahmeti, Erlangen (DE)

(73) Assignee: EVOSYS LASER GMBH, Erlangen (DE)

( * ) Notice: Subject to any disclaimer, the term of this patent is extended or adjusted under 35 U.S.C. 154(b) by 847 days.

(21) Appl. No.: 16/965,864

(22) PCT Filed: Feb. 4, 2019

(86) PCT No.: PCT/EP2019/052650
§ 371 (c)(1),
(2) Date: Jul. 29, 2020

(87) PCT Pub. No.: WO2019/149938
PCT Pub. Date: Aug. 8, 2019

(65) Prior Publication Data
US 2021/0053163 A1 Feb. 25, 2021

(30) Foreign Application Priority Data

Feb. 5, 2018 (DE) .................... 10 2018 102 494.0

(51) Int. Cl.
*B23K 37/04* (2006.01)
*B23K 26/06* (2014.01)
(Continued)

(52) U.S. Cl.
CPC ...... *B23K 37/0408* (2013.01); *B23K 26/0643* (2013.01); *B23K 26/26* (2013.01);
(Continued)

(58) Field of Classification Search
CPC ............ B23K 2103/42; B23K 26/0643; B23K 26/244; B23K 26/26; B23K 26/28;
(Continued)

(56) References Cited

U.S. PATENT DOCUMENTS 8,415,583 B2   4/2013   Brunnecker et al.
8,981,256 B2   3/2015   Stein et al.
(Continued)

FOREIGN PATENT DOCUMENTS

CN       104379297 A     2/2015
DE     102011087405 A1   6/2013
(Continued)

OTHER PUBLICATIONS

PCT/ISA/210, "International Search Report for International Application No. PCT/EP2019/052650," dated Apr. 25, 2019.
(Continued)

*Primary Examiner* — Dana Ross
*Assistant Examiner* — Joe E Mills, Jr.
(74) *Attorney, Agent, or Firm* — Manabu Kanesaka

(57) ABSTRACT

A clamping apparatus for clamping shaped parts which are welded along a welding contour by irradiation with a laser beam, includes a first clamping plate used as a holder for a first shaped part, a second clamping plate which is designed to apply a clamping force to the first shaped part and a second shaped part arranged thereon, an outer clamping jaw including a recess and an inner clamping jaw arranged in the recess, which together form the second clamping plate, a passage gap for the laser beam formed in sections between the outer clamping jaw and the inner clamping jaw, and one or more fastening elements which connect the outer clamping jaw with the inner clamping jaw in sections and which bridge the passage gap; and further includes a mirror ele-
(Continued)

Figure 1:
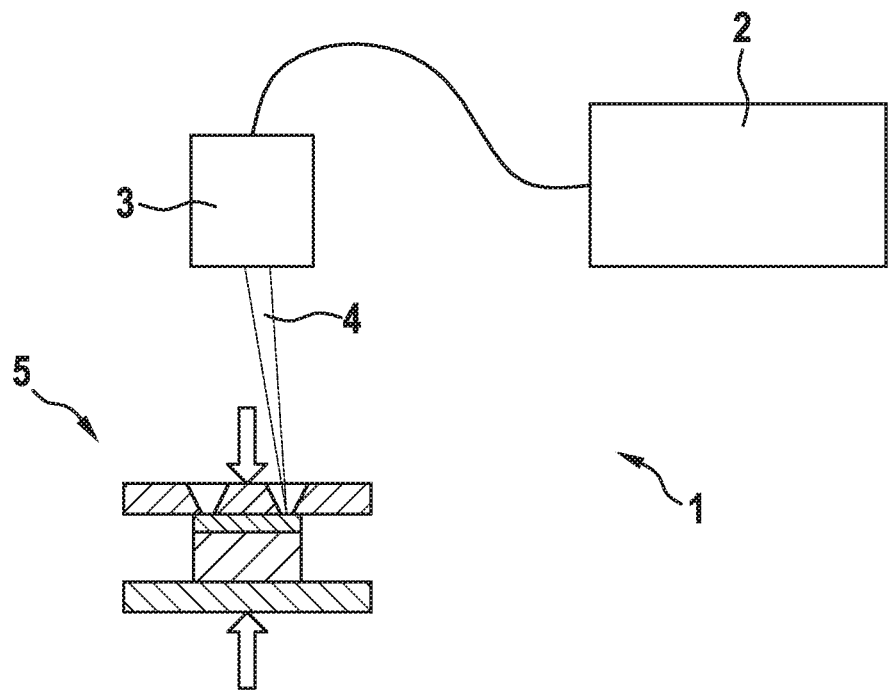

ment arranged such that the laser beam is reflected onto a section of the welding contour.

9 Claims, 2 Drawing Sheets

(51) Int. Cl.
 *B23K 26/26* (2014.01)
 *B29C 65/16* (2006.01)
 *B29C 65/00* (2006.01)
 *B23K 103/00* (2006.01)
(52) U.S. Cl.
 CPC ...... B23K 37/0435 (2013.01); B29C 65/1635 (2013.01); B29C 65/1661 (2013.01); B29C 66/41 (2013.01); B29C 66/73921 (2013.01); *B23K 2103/42* (2018.08)
(58) Field of Classification Search
 CPC ............. B23K 26/324; B23K 37/0408; B23K 37/0435; B29C 65/1609; B29C 65/1616; B29C 65/1635; B29C 65/1661; B29C 65/1687; B29C 65/1696; B29C 66/1122; B29C 66/24244; B29C 66/41; B29C 66/73921; B29C 66/8322; B29C 66/83221; B29C 66/80
See application file for complete search history.

(56) References Cited

U.S. PATENT DOCUMENTS

| | | |
|---|---|---|
| 2001/0028568 A1 | 10/2001 | Akiyama et al. |
| 2005/0109452 A1* | 5/2005 | Basque ............... B29C 66/7373 156/515 |
| 2005/0167407 A1 | 8/2005 | Chen |
| 2014/0353293 A1 | 12/2014 | Huonker |

FOREIGN PATENT DOCUMENTS

| | | |
|---|---|---|
| EP | 2591910 A1 | 5/2013 |
| JP | 2001-246488 A | 9/2001 |
| JP | 2004-66739 A | 3/2004 |
| JP | 2007-313821 A | 12/2007 |
| JP | 2013-203026 A | 10/2013 |
| JP | 2014-100867 A | 6/2014 |
| WO | 2008/125263 A1 | 10/2008 |
| WO | 2016/063720 A1 | 4/2016 |

OTHER PUBLICATIONS

China National Intellectual Property Administration, "Office Action with Search Report for Chinese Patent Application 201980009914. 5," dated Nov. 3, 2021.

* cited by examiner

CLAMPING DEVICE AND ASSOCIATED LASER WELDING APPARATUS

RELATED APPLICATIONS

The present application is National Phase of International Application No. PCT/EP2019/052650 filed Feb. 4, 2019, and claims priority from German Application No. 10 2018 102 494.0, filed Feb. 5, 2018, the disclosure of which is hereby incorporated by reference herein in its entirety.

The invention relates to a clamping apparatus for clamping at least two shaped parts which may be welded along a welding contour by irradiation with a laser beam, having the features of the preamble of claim 1.

Such clamping apparatuses, which are known per se, are used as components of laser welding devices with which plastics, especially thermoplastics, may be joined. For this purpose, two shaped parts are arranged one above the other, brought into contact with the clamping apparatus and clamped against each other. During the welding process, the joining surfaces of the two shaped parts touch each other. By means of a laser beam, the parts to be joined are melted in the area of the joining surfaces, thus welding them together.

When welding plastics with a laser beam using the transmission technique, the upper shaped part facing a laser source is usually made of a material that is transparent to the laser beam and the lower shaped part is made of a material that absorbs the laser beam. When the laser is irradiated with a wavelength in the near-infrared range, the adjacent contact surfaces melt and bond under pressure during the subsequent cooling process. The clamping apparatus used in this process has the task of precisely positioning the halves constituted by the parts to be joined and introducing a joining pressure, that is as uniform as possible, along the weld seam to be produced. Accordingly, the clamping apparatus is of great importance for the production of a high-quality welded joint.

Laser welding devices comprising such a clamping apparatus require a movement system for the laser in order to move the laser beam along a predefined welding contour. If a galvanometer scanner is used as a movement system, there may be restrictions because the predefined weld seam must be freely accessible for the laser beam deflected by the galvanometer scanner. By contrast, objects or obstacles along the laser beam would lead to a deterioration of the quality of the welded joint to be produced.

In WO 2008/125263 A1 a clamping apparatus is described which comprises the following: a first clamping plate used as a holder for a first shaped part, a second clamping plate which is designed to apply a clamping force to the first shaped part and a second shaped part arranged thereon, an outer clamping jaw comprising a recess, and an inner clamping jaw arranged in the recess, which together form the second clamping plate, and a passage gap for a laser beam formed in sections between the outer clamping jaw and the inner clamping jaw. In addition, the clamping apparatus comprises one or more fastening elements connecting the outer clamping jaw to the inner clamping jaw in sections and bridging the passage gap.

These fastening elements may, for example, be designed as narrow connecting bars in order to shade the laser beam as little as possible. With this conventional clamping technique, an inner clamping die is usually firmly connected to an outer clamping system via thin metal bars. It is not possible to apply laser energy directly below the metal bars, since the laser beam is shaded there by the metal bar. Instead, the joining zone in the area below the metal bars is only indirectly melted to a certain degree by the flow of the molten material, which results in a welded joint between the joining partners.

This conventional clamping apparatus, however, has some disadvantages. Since the bars are directly irradiated with the laser beam, the bars may be damaged after a certain period of operation, such that the service life of the clamping apparatus is limited. Since the beam is weakened in the region of the bars due to shading, this must be compensated for in a complicated way by process management, i.e. by controlling and modulating the laser beam. Due to the non-uniform energy input, it is difficult to produce an absolutely tight weld seam, but this is absolutely necessary for certain applications.

The invention is thus based on the object of specifying a damping apparatus which enables the production of a homogeneous and uninterrupted weld seam.

To achieve this object, a clamping apparatus having the features of claim 1 is provided.

Advantageous refinements of the invention are described in the dependent claims.

The invention is based on the idea of providing a clamping apparatus comprising, in the region of a fastening element, a mirror element which is arranged such that a laser beam is reflected onto a section of the welding contour concealed by fastening element. For this purpose, the mirror is arranged in the vicinity of those regions in which a fastening element is situated. In a conventional clamping apparatus, the fastening element would cause a shadowing of a section of the welding device to be produced. However, the mirror deflects the laser beam in such a way that it continuously follows the weld seam previously produced without deflection. In this way, a continuous weld seam may be produced. By means of the mirror element, the laser beam is only deflected in the region of the fastening element, such that the laser beam is reflected by the mirror element and impinges on the contact surfaces of the two shaped parts to be joined. There, the energy of the laser beam causes the plastics to melt. Cooling of the joining partners takes place under the effect of the pressure applied by the clamping apparatus, resulting in the desired welded joint. The clamping apparatus according to the invention has the advantage that no complicated process management, for example an adjustment of the laser power, is required in the region of the fastening elements. Thus, the laser beam may be guided along the desired welding contour with practically no significant change in process parameters.

A preferred variant of the clamping apparatus according to the invention provides that the mirror element is arranged on the outer clamping jaw or on the inner clamping jaw or on a fastening element. In principle, all the positions mentioned are suitable for the arrangement of the mirror element. The selection of the various positions is based on the shape and size of the outer and inner clamping jaws and the space available.

With the clamping apparatus according to the invention, it is particularly preferred that the mirror element is removably arranged on a holder. The term "holder" refers to a mechanical fastening that holds the mirror element in some way. For example, the fastening may be achieved by a screw connection, a clamp connection, a frictionally engaged and/or an interlocking connection. For example, the mirror element may be inserted into a corresponding groove and, if necessary, fixed in the groove. A removable fastening of the mirror element facilitates a later replacement in case of damage or if a change of the welding contour is required.

The mirror element of the clamping apparatus according to the invention may have a flat or a curved surface and/or may be composed of a plurality of mirror sections. This results in a variety of possibilities for deflecting the laser beam from the galvanometer scanner by means of the mirror element in order to irradiate a specific point of the shaped part.

The fastening element provided with the clamping apparatus according to the invention is preferably designed as a plate and has a passage opening for the laser beam. Alternatively, a plate open on one side may be provided instead of a passage opening; however, for reasons of stability, a plate having the passage opening is preferred.

The passage opening may be rectangular, square, round or elliptical, for example. In this context, it may be provided that the passage opening of the fastening element is offset outwards with respect to the passage gap. Accordingly, the passage opening is preferably situated outside the welding contour to be produced.

The fastening element, preferably designed as a plate, may be detachably connected to the inner and outer clamping jaws. Accordingly, the fastening element forms a connection bridging the two clamping jaws.

In addition, the invention relates to a laser welding device, comprising a laser for emitting a laser beam and a movement system for the laser. The laser welding device according to the invention is characterised in that it has a clamping apparatus of the type described.

Preferably, the laser beam of the laser welding device according to the invention has a wavelength between 600 nm and 2,500 nm.

Preferably, the movement system of the laser welding device according to the invention is designed as a galvanometer scanner.

Figure 2:
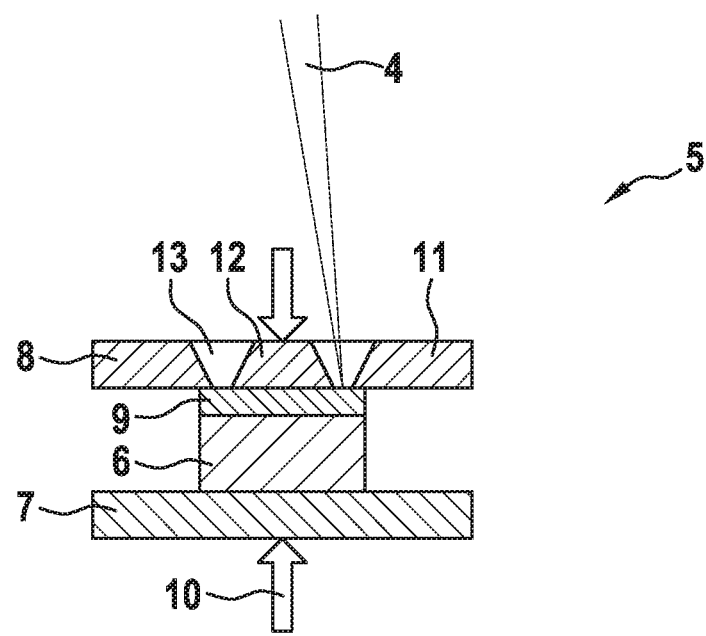
Figure 3:
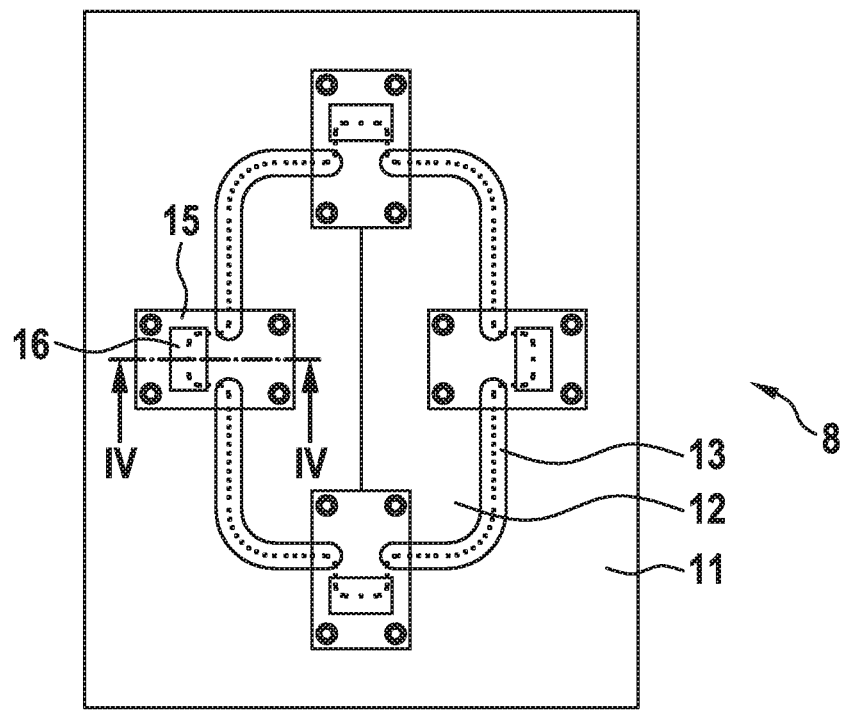
Figure 4:
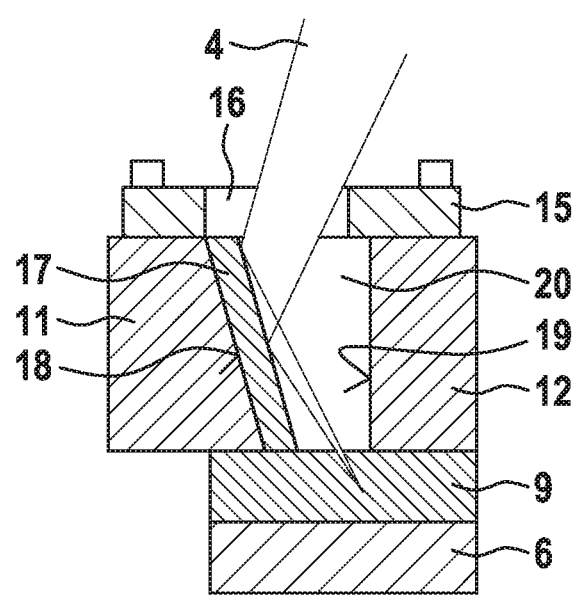

The invention will be explained hereinafter by means of exemplary embodiments with reference to the drawings. The drawings are schematic representations and show:

FIG. 1 the essential components of a laser welding device according to the invention, FIG. 2 an enlarged sectional view of a clamping apparatus according to the invention, FIG. 3 a plan view of the clamping apparatus, and FIG. 4 a sectional view of a fastening element of the clamping apparatus according to the invention along line IV-IV of FIG. 3.

The laser welding device 1 shown schematically in FIG. 1 comprises a laser 2 (laser system) including a controller and laser optics including a movement system 3 designed as a galvanometer scanner. The galvanometer scanner is designed to direct the laser beam to a specific position of a shaped part. The laser 2 comprises a beam source for generating a laser beam 4 (processing radiation), and the movement system 3 is used to move the laser beam.

In addition, the laser welding device 1 comprises a clamping apparatus 5, which is shown in FIG. 2 in an enlarged view. The clamping apparatus 5 comprises a first clamping plate 7, which is used as a holder for a first shaped part 6, and a second clamping plate 8, which is designed to apply a clamping force to the first shaped part 6 and a second shaped part 9 arranged thereon. In FIG. 2, the clamping force which presses the two shaped parts 6, 9 together is shown by two arrows 10. FIG. 2 shows that the first clamping plate 7 is the lower clamping plate on which the first shaped part 6 and the second shaped part 9 are arranged in this order. The upper, second shaped part 9 is subjected to the clamping force (compressive force) by the second, upper clamping plate 8.

The second clamping plate 8 is formed by an outer clamping jaw 11 and an inner clamping jaw 12. A passage gap 13 for the laser beam is formed between the outer clamping jaw 11 and the inner clamping jaw 12. In the sectional view of FIG. 2, two different points of the passage gap 13 are visible.

FIG. 3 shows the upper, second clamping plate 8 with the outer clamping jaw 11, the inner clamping jaw 12 and the passage gap 13 between them. The outer clamping jaw 11 is designed like a frame surrounding the inner clamping jaw 12. A welding contour 14 is represented by a dotted line in the passage gap 13. In the exemplary embodiment shown, the welding contour 14 has a basic rectangular shape with rounded corners.

The outer clamping jaw 11 and the inner clamping jaw 12 are connected by a plurality of fastening elements 15. Each fastening element bridges the passage gap 13. The fastening elements 15 are planar and are screwed to the outer clamping jaw 11 on one side and to the inner clamping jaw 12 on the other side.

In FIG. 3 it is shown that each fastening element 15 has approximately semi-circular recesses on its opposite longer sides.

FIG. 4 is a sectional view of a fastening element along line IV-IV of FIG. 3. A passage opening 16 for the laser beam 4 is formed on the fastening element 15. In this exemplary embodiment, the passage opening 16 is rectangular, but in other embodiments the passage opening may also have a different shape.

In FIG. 4 it is shown that a mirror element 17 is arranged on the fastening element 15 and is attached to an outer side 18 of the outer clamping jaw 11. The mirror element 17 is arranged at an angle, i.e. obliquely in relation to the plane formed by the planar fastening element 15. A free space 20 extends between the mirror element 17 and a surface 19 of the inner clamping jaw 12. A laser beam 4 emitted by the laser 2 passes through the passage opening 16 of the planar fastening element 15 and strikes the mirror element 17 and is reflected. The angle of incidence of the laser beam 4 is equal to the angle of reflection. The laser beam 4 then passes through the clearance 20 and impinges on the second shaped part 9. The point at which the laser beam 4 impinges on the second shaped part 9 is located below the planar fastening element 15, but not vertically below the passage opening 16. In this way it is possible, by deflecting the laser beam 4 by means of the mirror element 17, to direct the laser beam to those points which would otherwise be concealed by the fastening element 15, so that a continuous, uninterrupted welding contour may be produced without the need for time-consuming control of the laser beam during the welding process, for example by reducing or increasing the radiation power.

LIST OF REFERENCE SIGNS 1 laser welding device
2 laser
3 movement system
4 laser beam
5 clamping apparatus
6 first shaped part
7 first clamping plate
8 second clamping plate
9 second shaped part
10 arrow
11 outer clamping jaw
12 inner clamping jaw 13 passage gap
14 welding contour
15 fastening element
16 passage opening
17 mirror element
18 outer side
19 region
20 free space

The invention claimed is:

1. A clamping apparatus for clamping at least two shaped parts which are welded along a welding contour by irradiation with a laser beam, comprising:
   a first clamping plate used as a holder for a first shaped part,
   a second clamping plate which is designed to apply a clamping force to the first shaped part and a second shaped part arranged thereon,
   an outer clamping jaw comprising a recess and an inner clamping jaw arranged in the recess, which together form the second clamping plate,
   a passage gap for the laser beam formed in sections between the outer clamping jaw and the inner clamping jaw,
   one or more fastening elements which connect the outer clamping jaw with the inner clamping jaw in sections and which bridge the passage gap,
   wherein the clamping apparatus comprises, in a region of the fastening element, a mirror element which is arranged such that the laser beam is reflected onto a section of the welding contour concealed by the fastening element.

2. The clamping apparatus according to claim 1, wherein the mirror element is arranged on the outer clamping jaw or on the inner clamping jaw or on the fastening element.

3. The clamping apparatus according to claim 1, wherein the mirror element is removably arranged on a holder.

4. The clamping apparatus according to claim 1, wherein the mirror element has a flat or a curved surface or is composed of a plurality mirror sections.

5. The clamping apparatus according to claim 1, wherein the fastening element is designed as a plate and has a passage opening for the laser beam.

6. The clamping apparatus according to claim 5, wherein the passage opening of the fastening element is offset outwards with respect to the passage gap.

7. A laser welding device, comprising a laser for emitting a laser beam and a movement system for the laser, wherein the laser welding device comprises the clamping apparatus according to claim 1.

8. The laser welding device according to claim 7, wherein the laser beam has a wavelength between 600 nm and 2,500 nm.

9. The laser welding device according to claim 7, wherein the movement system is designed as a galvanometer scanner.

* * * * *